US009674166B2

(12) United States Patent
Wary et al.

(10) Patent No.: US 9,674,166 B2
(45) Date of Patent: Jun. 6, 2017

(54) METHOD FOR SECURING A REQUEST FOR EXECUTING A FIRST APPLICATION, BY A SECOND APPLICATION

(71) Applicant: ORANGE, Paris (FR)

(72) Inventors: Jean-Philippe Wary, Bourg la Reine (FR); Christophe Mathias, Issy les Moulineaux (FR); Guirec Lorant, Paris (FR); Jean Pierre Rosenthal, Antony (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/652,023

(22) PCT Filed: Dec. 12, 2013

(86) PCT No.: PCT/FR2013/053060
§ 371 (c)(1),
(2) Date: Nov. 4, 2015

(87) PCT Pub. No.: WO2014/091168
PCT Pub. Date: Jun. 19, 2014

(65) Prior Publication Data
US 2016/0080338 A1    Mar. 17, 2016

(30) Foreign Application Priority Data
Dec. 14, 2012   (FR) ...................... 12 62097

(51) Int. Cl.
*H04L 29/00* (2006.01)
*H04L 29/06* (2006.01)
(Continued)

(52) U.S. Cl.
CPC ............ *H04L 63/062* (2013.01); *G06F 21/44* (2013.01); *G06F 21/76* (2013.01); *H04L 63/08* (2013.01); *G06F 21/76* (2013.01); *H04W 12/08* (2013.01)

(58) Field of Classification Search
CPC . H04L 9/32; H04L 63/08; H04L 63/10; H04L 63/12; G06F 21/03; G06F 21/44
See application file for complete search history.

(56) References Cited

U.S. PATENT DOCUMENTS

2003/0119482 A1* 6/2003 Girard .................. G07F 7/1016
455/411
2007/0101122 A1* 5/2007 Guo ...................... H04L 63/061
713/153
(Continued)

OTHER PUBLICATIONS

Written Opinion of International Searching Authority from PCT/FR2013/053060.

*Primary Examiner* — Madhuri Herzog
(74) *Attorney, Agent, or Firm* — Haverstock & Owens LLP

(57) ABSTRACT

The invention relates to a method for securing a request for executing a first application (P1) in a first device (11) of a secured environment, by a second application (P2) located in a second device (10), said method including the following steps: receiving a first request to execute the first application, from the second application; generating a random number and a session key that is dependent on the random number, sending said random number to a trusted entity (12), said random number being intended for enabling the trusted entity to generate the session key, receiving a second request for executing the first application, from a third application (P3) generated by the trusted entity and transmitted to the second device, said third application including the session key, authenticating the third application by means of the session key, said authentication being the condition for the execution of the first application.

10 Claims, 2 Drawing Sheets

(51) Int. Cl.
*H04W 12/08* (2009.01)
*G06F 21/44* (2013.01)
*G06F 21/76* (2013.01)

(56) References Cited

U.S. PATENT DOCUMENTS

2009/0249080 A1    10/2009  Zhang et al.
2014/0188738 A1*   7/2014   Huxham ................. H04L 63/10
                                                              705/73

* cited by examiner

METHOD FOR SECURING A REQUEST FOR EXECUTING A FIRST APPLICATION, BY A SECOND APPLICATION

The invention relates to the field of security relating to computer programs. More precisely, the invention relates to a method for securing a request for execution of a first application by a second application. The second application, situated in a non-secure environment, calls upon the first application, situated in a secure environment.

The invention finds a particularly beneficial application in the case of an open terminal to which the user has access, for which he has no guarantee regarding the security implemented, and from which he wishes to access a sensitive application executed in a secure environment and which requires a significant security level. It is understood that in such a case, the user hesitates to execute the application from a terminal that is not necessarily safe. This may be the case for example, when the user wishes to access, from his mobile terminal, a remote application requiring authentication of the user, for example a banking application. Indeed, the user cannot be certain that, while inputting an authentication datum required by the application, a spy program, installed on his terminal without his knowledge, does not intercept the authentication data that he inputs for a subsequent fraudulent use.

To have the guarantee that a first and a second application interact in a trusted environment, it is known to undertake a mutual authentication between the applications. In the course of such an authentication, the first and the second application mutually afford proof of their respective identity. A known scheme for mutual authentication relies on the use of trusted electronic certificates, for example electronic certificates in the X.509 format. An X.509 certificate is a digital identity card which associates with an entity, for example a physical entity or an application, a certified public key. The public key is associated with a private key owned solely by the entity. The certificate is issued by a Certification Authority upon conclusion of a secure procedure. The certificate comprises a plurality of fields which include the public key, the identity of the owner of the public key, the identity of the Certification Authority and the services for which the certificate is issued, for example an authentication service. All the fields of the certificate are signed by the Certification Authority by means of a secret key of the Certification Authority. By this signature operation, the Certification Authority certifies the correctness of the data contained in the certificate. Thus, once the certificate has been issued to an entity, the latter can use its private/public key pair and the associated certificate to implement authentication services/services for which the certificate has been provided. For example, in the course of such an authentication a verifier entity, for example the first application, can ask the entity to be authenticated, for example the second application, to sign a challenge. The entity to be authenticated signs the challenge by means of its private key and transmits the signed challenge to the verifier entity. The verifier entity then verifies the signature by means of the certificate of the entity to be authenticated, which is a public datum: the public key featuring therein allows it to verify the cryptographic signature in the guise of datum, the certificate allows it to verify the validity of the public key. Indeed, the data which feature in the certificate make it possible to completely upload a certification chain to a higher Certification Authority, the so-called trusted Root Authority, and to verify the trust accorded to each of the links of this certification chain.

However, the level of security afforded by authentication by means of certificates may turn out to be insufficient in this context. Indeed, an item of equipment which hosts the second application, or entity to be authenticated, not being secure, a malicious person may alter the integrity of the verification procedures implemented by means of the certificate and thus undermine the security of the protocol implemented between the second application in the non-secure environment and the first application, or verifier entity, of the secure environment. The malicious person may also act deviously with regard to the keys of a certificate or the use of the latter, or indeed modify the keys and create a certificate of his choice and thus, decoy an authentication system. Moreover, recent compromises of Certification Authorities show that such an infrastructure is fallible in terms of security. Thus, there does not currently exist any satisfactory solution for authentication between a first application, located in a trusted environment and a second application, located in a non-secure environment.

One of the aims of the invention is to remedy inadequacies/drawbacks of the prior art and/or to afford improvements thereto.

To this end, the invention proposes a method for securing a request for execution of a first application by a second application, the first application being intended to be executed by a first device in a first secure environment, the second application being intended to be executed by a second device in a second environment, distinct from the first environment, said method comprising the following steps, implemented by the first device:

reception of a first request for execution of the first application, originating from the second application, generation of a random item for said first execution request and of a session key dependent on the random item generated, dispatching of said random item to a trusted entity, said random item being intended to allow the trusted entity to generate the session key, reception of a second request for execution of the first application, originating from a third application generated by the trusted entity and transmitted to the second device, said third application comprising the session key, and authentication of the third application by means of the session key, said authentication conditioning the execution of the first application.

The method of the invention thus makes it possible to generate a third application which interfaces with the secure application of the first device in such a way that the secure application and the third application execute in a so-called trusted environment. In particular, the third application is presumed trusted, although it executes on the second device which constitutes a non-secure, or even hostile, environment. Indeed, the third application, which interfaces with the secure application is authenticated when it asks to execute the secure application of the secure environment.

With the method of the invention, the code of the third application integrates a random character on account of the random item used during the generation of the code. The execution of the third application therefore varies from one execution to another. Certain attacks, based on a reverse engineering of the executed code, are therefore ineffective and an ill-intentioned person who might spy on the activity of the mobile terminal without the knowledge of the user could not deduce sensitive information of the user, such as authentication data, from the observations of this activity.

Advantageously, the method according to the invention furthermore comprises a step of generating a crypto-system, said crypto-system being used during the authentication step.

The crypto-system makes it possible to secure authentication by encrypting an authentication value transmitted by the third application upon the second request for execution of the secure application.

In an exemplary embodiment, the generation of the crypto-system comprises:
- a step of selecting at least two cryptographic functions from among a set of cryptographic functions, said selection being dependent on the random item, and
- a step of compounding said cryptographic operations.

In this example, the construction of the crypto-system depends on the random item and therefore varies for each generation of the third application. Authentication security is thus improved with respect to a constant crypto-system. Thus, spyware installed in the unsafe environment will encounter a few difficulties in spying on the authentication phase implemented by the third application, more precisely by successive instances of the third application. Indeed, on account of the non-predictable nature of the code of the third application, the attacker does not know in advance the form, the structure and the content of the code.

The invention also relates to a method for transmitting an authenticatable application to a first device in a first environment, comprising the following steps, implemented by a trusted entity:
- reception of a random item originating from a second device in a second environment, said second environment being secure and distinct from the first environment, said random item being generated for a first request for execution of a first application of the second device, originating from a second application of the first device,
- generation of a session key dependent on the random item,
- generation of an application authenticatable by means of the session key,
- dispatching of said authenticatable application to the first device, said third application being designed to authenticate itself with the first application upon a second request for execution of the first application.

The method for transmitting an application authenticatable according to the invention makes it possible to generate a unique application, called the third application. This third application is unique in the sense that the code instructions of which it is composed are different from one generation of authenticatable application to another, on account of taking into account the random item for the generation of this third application. Moreover, the third application comprises code instructions for implementing an authentication with the security element, this authentication conditioning the execution of the secure application hosted by the security module. Thus, this third application, although executed in a non-secure, or even hostile environment, is considered by the security element to be a trusted application.

In an advantageous manner, the method for transmitting an authenticatable application furthermore comprises:
- the dispatching to a server of a provider of configuration data, of a request for configuration data which are specific to a user of the first device,
- the receipt of configuration data, said configuration parameters being used to customize the authenticatable application during the step of generating the authenticatable application.

The provision by the provider of configuration data, of configuration data specific to the user and used for the generation of the code of the third application makes it possible to increase the trust that the user has during the execution of the third application on a terminal potentially situated in a potentially hostile environment, for example an Internet cafe. For example, such a datum is a photo chosen by the user and displayed on the user's terminal during the execution of the third application. In another exemplary embodiment, the configuration datum makes it possible to modify the actions that the user must make on his terminal by introducing variable parameters that can vary when inputting, for example, a sensitive item of information such as a service PIN code. In the latter case, security is thus improved in the sense that the observation by spyware of the characters input by the user is rendered difficult on account of the variable character of the characters input.

The invention also pertains to a secure device, hosting a first application, the device comprising:
- reception means, designed to receive a first request for execution of the first application, originating from a second application, the second application being hosted by a second device, distinct from the secure device, and to receive a second request for execution of the first application originating from a third application generated by a trusted entity and transmitted to the second device, said third application comprising a session key,
- generating means, designed to generate a random item for the first execution request and the session key dependent on the random item generated,
- dispatching means, designed to dispatch said random item to the trusted entity, said random item being intended to allow the trusted entity to generate the session key,
- authentication means, designed to authenticate the third application by means of the session key, the authentication of the third application conditioning the execution of the first application.

The invention also relates to a mobile terminal which comprises a secure device according to the invention.

The invention also relates to a trusted entity of a network, said entity being designed to generate and transmit an authenticatable application to a first device of a first environment, and comprising:
- reception means, designed to receive a random item originating from a second device in a second environment, said second environment being secure and distinct from the first environment, said random item being generated for a first request for execution of a first application of the second device, originating from a second application of the first device,
- first generating means, designed to generate a session key dependent on the random item,
- second generating means, designed to generate an application authenticatable by means of the session key,
- dispatching means, designed to dispatch said authenticatable application to the first device, said third application being designed to authenticate itself with the first application upon a second request for execution of the first application.

The invention also relates to a system for securing the execution of an application, comprising a trusted entity according to the invention, and at least one secure device according to the invention.

The invention also pertains to a program on a data medium and loadable into a memory of a secure device, the program comprising code portions for the execution of the steps of the method for securing a request for execution of a first application by a second application according to the invention, when the program is executed on said device.

The invention also relates to a data medium on which the above program is recorded.

The invention also relates to a program on a data medium and loadable into a memory of a computer, the program comprising code portions for the execution of the steps of the method for transmitting an application authenticatable according to the invention, when the program is executed on said computer.

The invention also pertains to a data medium on which the above computer program is recorded.

Numerous details and advantages of the invention will be better understood on reading the description of a particular embodiment with reference to the appended drawings given without limiting effect, and in which:

FIG. 1 presents the steps of a method for securing a request for execution of a first application by a second application, according to a first exemplary embodiment;

Figure 1:
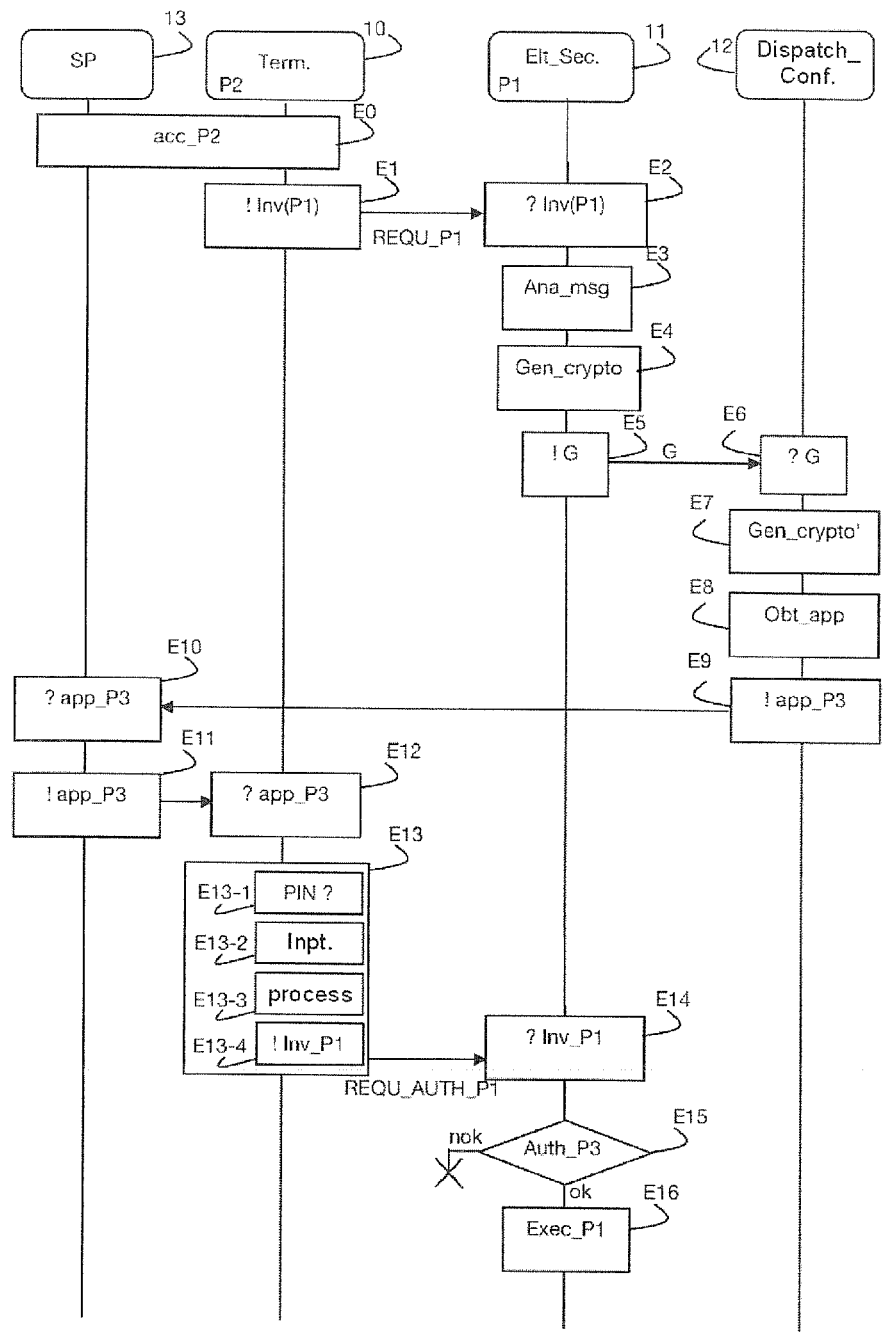

The steps of a method for securing a request for execution of a first application by a second application, according to a first exemplary embodiment will now be described in conjunction with FIG. 1.

The method is illustrated here within the framework of an on-line purchase service offered by a service provider 13.

A user (not represented in FIG. 1) who is the owner of a mobile terminal 10 wishes to access from his mobile terminal 10 an on-line purchase service offered by the service provider 13. This service requires the execution of a secure application. The mobile terminal 10 is an open terminal and therefore constitutes a presumed non-secure software environment, on which spyware may be installed, or control of which may be taken by a malicious person. A security element 11, inserted into the mobile terminal 10, constitutes a secure environment. A secure environment is an environment in which applications and data are stored in a secure manner. Such an environment is for example a "SIM" ("Subscriber Identity Module") card, or a "UICC" ("Universal Integrated Circuit Card") card. Access to the secure environment consisting of the SIM card is in a conventional manner protected by an access control, such as a "PIN" ("Personal Identification Number") code for accessing the SIM card. The user wishes to execute, from his mobile terminal 10, a first application P1, the so-called secure application, installed in the security element 11. Accordingly, the user accesses for example a menu from his mobile terminal 10, said menu allowing him to select and to execute a second application P2, the so-called non-secure application since it is executed from the non-secure environment. The selection and the execution of the application P2 from the mobile terminal 10 triggers a request for execution of the secure application P1, installed in the security element 11. The application P2 is for example an application relating to a payment service whose execution is conditioned by a successful authentication of the user carried out on the basis of the application P2 by a program located on the SIM card. Stated otherwise, the application P2, located on the terminal 10, when it executes, requests the execution of the secure application P1 located in the security element 11. In our example, the secure application P1 corresponds to a payment application, which in its first steps requests authentication of the user by means for example of an inputting of a service "PIN" code.

Thus, in an initial step E0, the user requests execution of an application P2 from his mobile terminal 10. For example, the user accesses a menu of his mobile terminal 10 which comprises a plurality of applications, he selects the application P2 that he wishes to launch, and then validates his choice. The application P2 is for example an on-line purchase service offered by the service provider 13 and comprises access to the service provider 13, by means of an Internet access. In this example, the user therefore accesses the application P2 from his mobile terminal 10 by means of a Web browser. In first exchanges with the service provider 13, the user initiates a transaction and chooses one or more articles which constitute what is customarily called a basket. A validation of his basket is then followed by a phase intended to validate the payment for the basket. This phase, which is sensitive, requires validation of the amount of the basket by the user and authentication of the latter.

To this end, in a step E1 of dispatching a request, triggered in the course of the execution of the application P2 on the mobile terminal 10, a request REQU_P1 requesting execution of the secure application P1 is dispatched to the security element 11. In the case of the on-line purchase service, the request REQU_P1 is a payment request which comprises parameters specific to the transaction in progress and to its execution environment. For example, the parameters of the transaction comprise a transaction identifier, a transaction amount, an identifier of the purchase service, a user identifier, for example a "MSISDN" ("Mobile Station ISDN Number") number of the subscriber, or number "known to the public", technical characteristics of the mobile terminal 10 in the form for example of an "IMEI" ("International Mobile Equipment Identity") number, and a unique identifier of the service provider 13. The unique identifier of the service provider 13 is intended to route requests to this service provider; this can be a "URL" ("Uniform Resource Locator"), an IP address, etc. The technical characteristics of the mobile terminal 10 are intended to provide technical information specific to the mobile terminal 10: type of terminal, size of the screen, memory size, etc. The request REQU_P1 is intended to trigger the execution of the secure application P1 in the security element 11. The application P1 is here a payment application which comprises for example a phase of inputting a service PIN code. The inputting of a correct service PIN code is necessary in order to unblock the use of a secret key stored in the security element so as to execute an operation of cryptographic signature of the transaction in progress.

In a reception step E2, the security element 11 receives said request REQU_P1 requesting execution of the secure application P1. More precisely, an active program for supervision (not represented in FIG. 1) of the security element 11 is suitable for receiving messages dispatched to the security element 11 and for analyzing them. It receives in particular the request REQU_P1.

In an analysis step E3, the supervision program of the security element 11 analyses the request for execution REQU_P1 and associates with it a current context, specific to the service execution within the secure environment 11 initiated from the mobile terminal 10. The execution context comprises several items of information which include a unique identifier of execution context, the transaction-specific parameters received from the mobile terminal 10 in the course of the reception step E2 and a technical identifier of the security element 11. This technical identifier of the security element 11 is for example the "IMSI" ("International Mobile Subscriber Identity") number stored in the security element 11, the MSISDN number, or if appropriate an IP address of the security element 11. This technical identifier is intended to communicate with the security element 11. The analysis of the request REQU_P1 shows that an execution of the secure application P1, stored in the security element 11, is requested.

In a step E4 of generating a cryptographic material, a cryptographic material is generated by the supervision program, for the current request for execution REQU_P1. The cryptographic material comprises a random value G, a crypto-system C and a session key $K_{sess}$. The random value G is a string of bits, of significant size, for example greater than 1100 bits and generated by means for example of a pseudo-random generator. The session key $K_{sess}$, of a given size, for example 128 bits, is generated on the basis of the random value G. For example, the session key $K_{sess}$ corresponds to the first 128 high-order bits of the random value G, or to the first 128 even bits of the random value G, or any other operation performed on the basis of a subset of bits of G. The crypto-system C comprises at least one cryptographic encryption function. In this exemplary embodiment, the crypto-system C is composed of a secret-key cryptographic algorithm, for example the "AES" ("Advanced Encryption Standard") algorithm. The crypto-system C is intended to produce at least one authentication value intended to be presented upon a request for subsequent execution of the secure application P1 by a third application P3 from the mobile terminal 10. To this end, the crypto-system C is designed to be parametrized by the session key $K_{sess}$ in the guise of secret key of the cryptographic encryption function, and to produce, on the basis of an input parameter, the authentication value. For example, the input parameter is a challenge. In a second exemplary embodiment, the input parameter consists of call parameters of the secure application P1. In a third exemplary embodiment, the input parameter is an instruction requesting execution of the secure application P1. Thus, the supervision program of the security element 11 is able to decrypt a content encrypted by means of the crypto-system C parametrized by the session key $K_{sess}$. The supervision program of the security element 11 stores the session key $K_{sess}$ and the crypto-system C in association with the identifier of the current execution context.

In a step E5 of transmission to a trusted entity 12, the security element 11, more precisely the supervision program, transmits to the trusted entity 12, a generation message comprising the random value G generated upon receipt of the request for execution REQU_P1 in the course of step E3, an identifier of the secure application P1 and the current context, specific to the service execution in progress within the security element 11. In the exemplary embodiment described here, the transmission of the message is performed by means of at least one "SMS" ("Short Message Service"). The message is received by the trusted entity 12 in the course of a reception step E6. It is assumed that the transmission channel between the secure environment 11 and the trusted entity 12 is secure. In this exemplary embodiment, the trusted entity 12 comprises a server of a mobile network operator to which the user has subscribed. Such a network is for example the "GSM" ("Global System for Mobile communications") network. It is known that a communication established in a mobile network benefits from a security level inherent to this type of communication: authentication between the radio network and the security element, and encryption of the radio pathway.

In a step E7 of generating the cryptographic material, the trusted entity 12 generates the same session key $K_{sess}$ and the same crypto-system C as those generated in the security element 11 in the course of step E4. To this end, the trusted entity 12 uses the random value G received from the security element 11 and applies the same rules as those used by the security element 11 to generate the session key $K_{sess}$ and the crypto-system C. It is understood that the trusted entity 12 is availed of the same data as the security element 11 to generate these elements. Thus, at the end of the generation step E7, the trusted entity 12 is availed of the random value G, received from the trusted environment 12, the session key $K_{sess}$ that it has generated and the crypto-system C that it has generated. It is also availed of the current execution context and of the identifier of the secure application P1. At this juncture, the security element 11 and the trusted entity 12 share conventions, in this instance the session key $K_{sess}$ and the crypto-system C.

In a step E8 of obtaining an application, the trusted entity 12 generates a third application P3 on the basis of the session key $K_{sess}$, of the crypto-system C, of the current execution context and of the identifier of the application P1. The third application P3, intended to be installed and executed on the mobile terminal 10, comprises instructions of a program code that are suitable for interfacing with the secure application P1 in a secure manner. In particular the third application P3 comprises code instructions for authenticating itself with the secure environment 11 and then for requesting the execution of the secure application P1. For example, in the case where the secure application P1 is a payment application, which needs a service PIN code in order to unblock access to a secret key and to implement a signature operation by means of this secret key, then the third application P3 generated comprises code instructions allowing the inputting of the PIN code on the user's mobile terminal 10, as well as a shaping of the PIN code input. Shaping of the PIN code input is intended to mean a preparation of the PIN code for dispatch to the security element 11. In the example described here, the shaping corresponds to an encryption of the PIN code input for the attention of the secure application P1 by means of the cryptographic material generated by the trusted entity 12 in the course of step E7, in this instance the crypto-system C and the session key $K_{sess}$. The encryption of the PIN code input by the crypto-system C by means of the session key $K_{sess}$ is intended to implement an implicit authentication of the third application P3 by the security element 11, and therefore by the secure application P1. Indeed, the third application P3 and the security element 11 share the knowledge of the session key $K_{sess}$ and of the crypto-system C. An implicit authentication is therefore carried out provided that the decryption of the datum transmitted from the mobile terminal 10 to the security element 11 is performed correctly. To generate the third application P3, it is assumed that the trusted entity 12 is availed of a program library in which it can find, in association with the identifier of the secure application P1 and the technical characteristics of the mobile terminal 10 included in the current execution context, at least one program which corresponds to a program code suitable for executing on the mobile terminal 10 and for interfacing with the secure application P1.

Such a third application P3 can be generated by the trusted entity 12 by means of a compiler designed to produce a code executable on the basis of the session key $K_{sess}$, of the crypto-system C and of the program stored in the library of programs in association with the secure application P1 and the technical characteristics of the mobile terminal 10. The code of the third application P3 depends on the session key $K_{sess}$. It is therefore different at each execution of the purchase service on the mobile terminal 10.

In a step E9 of dispatching the application, the trusted entity 12 dispatches the third application P3 as well as the current execution context to the service provider 13. The unique identifier of the service provider 13, included in the current execution context received from the security element 11, allows the trusted entity 12 to dispatch the third application P3 to the service provider 13. The dispatching of the third application P3 to the service provider 13 is performed via a transmission made secure according to a known scheme. The third application P3 is for example dispatched to the service provider 13 using a secure protocol, for example HTTPS. The third application P3 is received by the service provider 13 in the course of a reception step E10.

In a step E11 of dispatching to the mobile terminal, the service provider 13 dispatches the third application P3 to the mobile terminal 10. To this end, it generates a Web page comprising an automatic downloading link for the third application P3, and dispatches this page to the mobile terminal 10. The page is received by the mobile terminal 10 in the course of a reception step E12. Preferably, the third application P3 is signed by the service provider 13.

In a step E13 of commanding execution, subsequent to the receipt of the page comprising the downloading link for the third application P3, the page received is displayed and the third application P3 is automatically, that is to say without user intervention, executed on the mobile terminal 10. This display and the execution of the third application P3 are transparent to the user. Indeed, in the case where the code of the third application P3 is signed by the trusted entity 12, the execution on the mobile terminal 10 is not subjected to an authorization of the user provided that the certificate of the trusted entity is already installed on the user's mobile terminal 10. To this end, provision may be made, in a prior initialization phase, implemented during the first execution of the purchase service offered by the service provider 13 on the user's mobile terminal 10, the dispatching of the certificate of the trusted entity 12 to the user's mobile terminal for installation. The dispatching of the certificate is not intended here to improve security but to fluidify the execution of the third application P3 from the user's point of view. In the example of the on-line purchase service described here, the execution of the third application triggers in a sub-step E13-1 of request, a request to the user to input a service PIN code on a man-machine interface of the mobile terminal 10. For example, a service PIN code inputting window is displayed on the screen of the mobile terminal 10. In a sub-step E13-2 of inputting, the user inputs his service PIN code on the keyboard of the mobile terminal 10. In a step E13-3 of processing, the third application P3 calculates an authentication value for the attention of the secure application P1. For example, the authentication value is obtained by encryption of the service PIN code input by means of the crypto-system C parametrized by the session key $K_{sess}$. In another exemplary embodiment, other data can be used as a supplement to the service PIN code input to calculate the authentication value: the context identifier, or/and any item of information contained in the context and known to the secure environment 11. In a step E13-4 of requesting execution, the third application P3 dispatches to the security element 11 a second request requesting execution REQU_AUTH_P1 of the secure application P1, with the authentication value calculated and the identifier of the current execution context. Sub-steps E13-1 of request, E13-2 of inputting, E13-3 of processing and E13-4 of request of execution are sub-steps executed within the framework of the execution of the third application P3. The second request REQU_AUTH_P1 requesting execution of the secure application P1 is received by the security element 11 in the course of a reception step E14.

In an authentication step E15, the supervision program authenticates the second request received REQU_AUTH_P1. To this end, the supervision program of the security element 11 decrypts the authentication value transmitted in the second request for execution REQU_AUTH_P1 by the third application P3 by applying the crypto-system C parameterized by the session key $K_{sess}$. It obtains the session key $K_{sess}$ and the crypto-system C on the basis of the context identifier with which these data have been associated in the course of step E4 of generating the cryptographic material. If the decrypted authentication value is correct ("ok" branch in FIG. 1), this signifies that the service PIN code obtained by decryption of this value is correct. This service PIN code then allows the execution of the secure application P1 in the course of an execution step E16. If the decrypted authentication value is not correct ("nok" branch in 1 in FIG. 1), the method stops. The decryption of the authentication value constitutes an implicit authentication of the third application P3 by the security element 11. It therefore constitutes an implicit authentication of the third application P3 with the secure application P1. Indeed, if the decryption is performed correctly, then this signifies that the security element 11 and the third application P3 share the same session key $K_{sess}$ and the same crypto-system C. In the case where the authentication value is the PIN code of encrypted service, the supervision program provides this decrypted datum to the application P1, on standby of a service PIN code. In the case where the authentication value comprises data included in the current execution context, authentication of the third application P3 is carried out provided that the supervision program identifies the data decrypted in the current context. In the case where the secure application P1 is a payment application, successful authentication of the third application P3 makes it possible to unblock access to the secret key and to implement the transaction signature operation so as to validate the payment. Thus, authentication of the third application P3 conditions the execution of the secure application P1.

Thus, with the method of the invention, the secure application P1 and the third application P3 execute in a so-called trusted environment. In particular, the third application P3 is presumed trusted, although executing in a non-secure, or even hostile, environment.

In the exemplary embodiment described, the crypto-system C is reduced to a symmetric cryptographic function. The invention is not limited to a single function. Thus, in another exemplary embodiment, the crypto-system C is generated by choosing several cryptographic functions from a library of symmetric cryptographic functions which are then combined. In an exemplary embodiment, the functions are combined by means of an EXCLUSIVE OR operation. In another exemplary embodiment, the functions are chained, the result of a first function being taken as input parameter of a second function. The choice of the cryptographic functions intended to generate the crypto-system C can be directed by the random value G, and therefore vary at each implementation of the method. The choice of the functions of which the crypto-system is composed is then random. Featuring among these cryptographic functions are symmetric cryptographic algorithms parametrized by a secret key, for example AES, "DES" ("Data Encryption Standard"), 3DES. Linear feedback shift registers ("LFSRs") may also be used to produce strings of pseudo-random numbers. According to the symmetric algorithm, keys of various sizes may be necessary. In this case, during steps E4 and E7 of generating the cryptographic material, several session keys will be able to be generated on the basis of the random item G. In another exemplary embodiment, permutation tables customarily used in symmetric cryptographic algorithms are altered from one execution to another so as to avoid any reverse engineering which would make it possible to obtain information about the structure of the session key $K_{sess}$.

In another exemplary embodiment (not represented) of the invention, when the trusted entity 12 receives from the security element 11, in the course of the step E5 of transmission to the trusted entity 12, the random item G and the current execution context, it interrogates a server of a provider of configuration data so as to obtain configuration data specific to the user. The provider of configuration data can be the service provider 13. The server of the configuration data provider stores configuration data specific to the user and to the secure application P1 in association with an identifier of the user. These configuration data can be used by the trusted entity 12 during the generation of the third application P3 to customize the third application P3. Thus, in an exemplary embodiment, a configuration datum is an image or a photo chosen by the user. This image or this photo is integrated into the third application P3 and is displayed on the screen of the user's terminal 10 when the third application P3 is received and executed on the terminal 10 in the course of step E12. The display of this image or photo is intended to give the user confidence during the execution of the third application P3. Thus, when the third application P3 is a service PIN code inputting interface on the user's mobile terminal 10, a customization of this application can consist of an interface which makes it possible to render the inputting of the characters of the PIN code unpredictable. For example, this interface can prompt the user when inputting the service PIN code to add to each of the digits input a digit displayed on the screen. Thus, spyware which might store the sequence of buttons selected by the user could not deduce the service PIN code therefrom. Such a customization of the third application P3 makes it possible to give the user confidence when the third application P3 is executing, and if appropriate to strengthen the security.

In the example described here, the supervision program receives the first and second requests for execution of the secure application P1, manages the current execution context, generates the session key $K_{sess}$ and the crypto-system C. In another exemplary embodiment corresponding to a case where the security element 11 is dedicated to the secure application P1 and hosts only this application, then it is the secure application P1 which receives the requests for execution, manages the context, undertakes the calculation of the cryptographic material and the authentication of the third application P3 by decryption of the encrypted authentication value received.

In another exemplary embodiment, the cryptographic material generated and shared between the security element 11 and the third application P3 is used to construct a secure communication channel between the mobile terminal 10 and the security element 11. To this end known protocols such as "SSL" ("Secure Socket Layer"), "IPSec" ("Internet Protocol Security") can be used. The channel can thus be constructed between the third application P3 and the secure environment 11. Thus, end-to-end security is implemented within the framework of subsequent exchanges between the third application P3 and the secure environment 11. Note that the security element 11 is considered a secure environment. Inside the latter, security elements managed by the supervision program can be transmitted to the secure application P1 to offer end-to-end security, that is to say up to the application P1.

The invention is described here within the framework of an on-line purchase application, selected and executed from the mobile terminal 10, and which controls the execution of a payment application on the SIM card, more precisely of a cryptographic primitive in the secure environment 11. The invention is of course not limited to such an application. The method also applies to any type of application which requires the execution of a secure application on the security element 11. Thus, the method can also apply to health applications which require controlled access to personal health data, to access control applications, which require authentication of the user, to banking applications, which require authentication of the user in respect of sensitive operations. More generally, the invention applies to any service which requests the execution, on the basis of an unsafe environment, such as a mobile terminal, a PC, of a sensitive application located in a secure environment. The invention also applies to "NFC" ("Near Field Communication") services, hosted on the security element and which require authentication of the user before they are executed. In this context, the method therefore applies also to NFC applications of micro-payment type, applications of control of access to buildings, of paperless travel passes, etc.

The security element 11 described here is a SIM card or a UICC card. The invention is not limited to this type of security element. Thus, in another exemplary embodiment, the security element 11 is a secure memory area of the mobile terminal such as a "TEE" ("Trusted Execution Environment") component embedded onboard the processor, or a removable component of microSD type ("SD" for SanDisk®). Moreover, in the example described here, the secure environment 11 is a secure physical device. The invention is not limited to this embodiment. Thus, in another exemplary embodiment the security element 11 is a secure software environment, which is availed of the same security properties as a secure physical environment. For example, the security element is a software SIM card, managed in a database of software SIM cards, a software SIM card being dedicated to a user. This database is protected by suitable physical security procedures; such a base may otherwise be regarded as a security services cloud in which instances of the secure application P1 would be dedicated to each user.

In another exemplary architecture (not represented), the user possesses a personal computer of PC type. A network device of modem-router type is suitable for connecting various peripherals, including the user's PC, to the Internet network. The modem-router is designed so that the user inserts a personal card of bank card type so as to implement payment services. The invention may advantageously be applied in order to secure the call of a cryptographic function of the payment card from the user's PC.

The invention finds a beneficial application within the framework of a remote maintenance service. For example, a remote automobile maintenance service allows a technician, from a computer of PC type, to access a vehicle equipped with a security module. This security module is intended to control access to an onboard computer. The onboard computer makes it possible to remotely control, from the technician's computer, a series of electronic components of the car, such as sensors, an electronic system for opening doors, etc. It is known that such PCs are copied/stolen, thus allowing access to the vehicle by an ill-intentioned person. With the invention, access to the vehicle's security module from the technician's computer triggers a request of a third application, authenticatable by the security module of the vehicle. This request is transmitted to the technician's computer and relayed to a trusted server of the automobile manufacturer. Access to the trusted server assumes authentication of the technician. The third application is generated and then downloaded to the technician's computer. This third application authenticates itself with the security module so as to access the vehicle's onboard computer. The code of the third application is different and authenticated at each execution. A malicious person who might have copied or stolen the technician's computer could not therefore use it to access the vehicle's onboard computer.

In the exemplary embodiment described here, the transmission of the message for generating the secure environment 11 to the trusted entity 12 in the course of the transmission step E5 is made secure by means of procedures inherent to the GSM network. The invention is not limited to the use of these procedures and in another embodiment of the invention, in which the security module 11 complies with the GlobalPlatform specifications accessible in the document "Specifications: GlobalPlatform Card specifications v2.2.1 Public Release", the interfaces for accessing the security module which are defined in these specifications are used.

Figure 2:
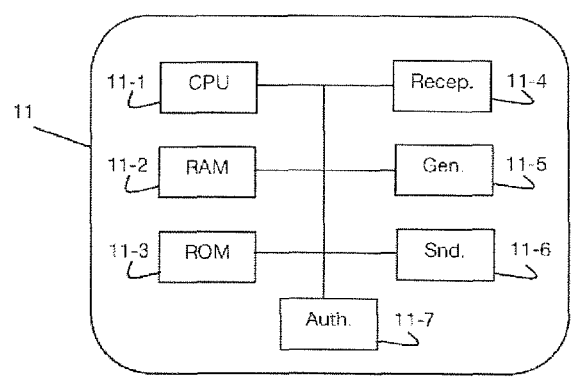
FIG. 2 is a schematic representation of a security element, according to a first exemplary embodiment.

A secure device 11 according to a first exemplary embodiment of the invention will now be described in conjunction with FIG. 2. In the exemplary embodiment described here, the secure device 11 is a SIM card inserted into a subscriber mobile terminal (not represented in FIG. 2). The secure device 11 according to the invention comprises:
- a microprocessor 11-1, or "CPU" ("Central Processing Unit"), intended to load instructions into memory, to execute them, to perform operations;
- a set of memories which include a volatile memory 11-2, or "RAM" (for "Random Access Memory"), used to execute code instructions, to store variables, etc., and a storage memory 11-3 of "EEPROM" ("Electrically Erasable Programmable Read Only Memory") type. The storage memory 11-3 is designed to store the secure application P1. The storage memory also stores data and applications specific to the subscriber and to the mobile network. It thus stores an identifier of the subscriber, for example an IMSI number and data of the operator such as keys, cryptographic algorithms;
- reception means 11-4, designed to receive a first and a second request for execution of the secure application P1, stored in the storage memory 11-3 of the secure device 11. The first and the second request for execution of the secure application P1 originate from a second device, distinct from the secure device 11. More precisely the first execution request originates from a first application hosted by the second device and the second execution request originates from a third application authenticatable by the secure application and also hosted by the second device. In the example described here, the second device is the subscriber's mobile terminal;
- generating means 11-5, designed to generate the random item G for the first request for execution of the secure application, as well as the session key $K_{sess}$ which depends on the random item generated;
- dispatching means 11-6, designed to dispatch said random item to the trusted entity 12 (not represented in FIG. 2). The random item G is intended to allow the trusted entity 12 to generate the session key. In the example described here, the dispatching means generate an SMS message which comprises the random item G and use the radio interface of the mobile terminal to transmit the random item to the trusted entity;
- authentication means 11-7, designed to authenticate the third application P3 by means of the session key, the authentication of the third application conditioning the execution of the first application.

In the exemplary embodiment where the security device is a SIM card inserted into a mobile terminal, the reception means correspond to a communication interface between the mobile terminal and the SIM card.

The reception means 11-4, the generating means 11-5 and the dispatching means 11-6 are preferably software modules comprising software instructions for enabling execution of the steps of the above-described method for securing a request for execution of a first application by a second application.

The invention therefore also relates to:
- a program comprising instructions for the implementation of the method such as described above for securing a request for execution of a first application by a second application when this program is executed by the processor of the security device 11;
- a readable recording medium on which the program described hereinabove is recorded.

The software modules can be stored in, or transmitted by, a data medium. The latter can be a hardware storage medium, for example a CD-ROM, a magnetic diskette or a hard disk, or else a transmission medium such as a signal or a telecommunication network.

As described above, the invention is of course not limited to a security element of SIM card type. For example, a security module complying with the GlobalPlatform specifications can be used. In this case, the above-defined means, especially the dispatching and reception means, use the communication interfaces defined by this organization. In another exemplary embodiment, the security element is a software device managed in a database of subscriber software devices, the base being protected by physical measures. The dispatching and reception means then use the interfaces offered by the database.

Figure 3:
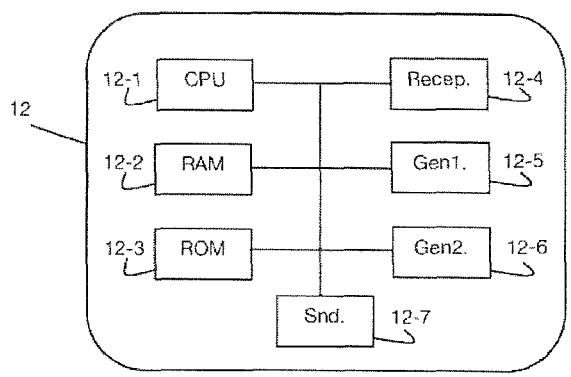
FIG. 3 is a schematic representation of a trusted entity, according to a first exemplary embodiment.

A trusted entity 12, according to a first exemplary embodiment will now be described in conjunction with FIG. 3.

In this exemplary embodiment, the trusted entity is an item of computing equipment of a mobile network operator, designed to receive from a security element inserted into a device of mobile terminal type, via the operator's mobile network, information for performing processings, and for generating an application which will authenticate itself with the security element. More precisely, the trusted entity 12 comprises:
- a microprocessor 12-1, or CPU, intended to load instructions into memory, to execute them, to perform operations;
- a set of memories which include a volatile memory 12-2, or RAM used to execute code instructions, to store variables, etc., and a storage memory 12-3 of EEPROM type. The storage memory 12-3 is in particular designed to store the code of the compiler used to generate the authenticatable application P3, store information about the subscriber users;
- reception means 12-4, designed to receive the random item G from the security element. The random item G has been generated by the security element on receipt of a first request for execution of the secure application P1 hosted by the security element. The first request for execution of the secure application emanates from a second application external to the security element. For example, the second application is hosted by the mobile terminal in which the security element is inserted;

first generating means 12-5, designed to generate a session key $K_{sess}$ dependent on the random item, second generating means 12-6, designed to generate an application authenticatable P3 by means of the session key, dispatching means 12-7, designed to dispatch the authenticatable application P3 to the mobile terminal. The authenticatable application is designed to authenticate itself with the secure application upon a second request for execution of the secure application.

The first reception means 12-4, the second reception means 12-5, the generating means 12-6 and the dispatching means 12-7 are preferably software modules comprising software instructions for executing the steps of the above-described method for transmitting an authenticatable application.

The invention therefore also relates to:
- a computer program comprising instructions for the implementation of the method such as described above for transmitting an authenticatable application when this program is executed by a processor of the trusted entity 12;
- a readable recording medium on which the computer program described hereinabove is recorded.

The software modules can be stored in, or transmitted by, a data medium. The latter can be a hardware storage medium, for example a CD-ROM, a magnetic diskette or a hard disk, or else a transmission medium such as a signal or a telecommunication network.

The invention also relates to a system for securing the execution of an application which comprises a trusted entity according to the invention and at least one secure device according to the invention.

The invention claimed is:

1. A method for securing a request for execution of a first application by a second application, the first application being executed by a first device in a first secure environment, the second application being executed by a second device in a second environment, distinct from the first environment, said method comprising the following steps, implemented by the first device:
   reception of a first request for execution of the first application, originating from the second application,
   generation of a random item for said first execution request and of a session key dependent on the random item generated,
   dispatching of said random item to a trusted entity, said random item being used by the trusted entity to generate the session key,
   reception of a second request for execution of the first application, originating from a third application generated by the trusted entity and transmitted to the second device, said third application calculating and encrypting an authentication value using the session key, and
   authentication of the third application by decrypting the encrypted authentication value by means of the session key, said authentication conditioning the execution of the first application.

2. The method as claimed in claim 1, furthermore comprising a step of generating a crypto-system, said crypto-system comprising at least one cryptographic encryption function, said crypto-system being used during the authentication step to encrypt the authentication value.

3. The method as claimed in claim 2, in which the generation of the crypto-system comprises:

a step of selecting at least two cryptographic functions from among a set of cryptographic functions, said selection being dependent on a random item used to generate the session key, and a step of compounding said cryptographic operations.

4. A method for transmitting an authenticatable application to a first device in a first environment, comprising the following steps, implemented by a trusted entity:
   reception of a random item originating from a second device in a second environment, said second environment being secure and distinct from the first environment, said random item being generated for a first request for execution of a first application of the second device, originating from a second application of the first device,
   generation of a session key dependent on the random item,
   generation of an authenticatable application, said authenticatable application comprising instructions to calculate and encrypt an authentication value using the session key,
   dispatching of said authenticatable application to the first device, said authenticatable application authenticating itself with the first application upon a second request comprising the authentication value for execution of the first application.

5. The method as claimed in claim 4, furthermore comprising:
   the dispatching to a server of a provider of configuration data, of a request for configuration parameters which are specific to a user of the first device,
   the receipt of configuration data, said configuration parameters being used to customize the authenticatable application during the step of generating the authenticatable application.

6. A secure device, hosting a first application, the device comprising:
   reception means for receiving a first request for execution of the first application, originating from a second application, the second application being hosted by a second device, distinct from the secure device, and to receive a second request for execution of the first application originating from a third application generated by a trusted entity and transmitted to the second device, said third application comprising a session key,
   generating means for generating a random item for the first execution request and the session key dependent on the random item generated,
   dispatching means for dispatching said random item to the trusted entity, said random item being intended to allow the trusted entity to generate the session key,
   authentication means for authenticating the third application by means of the session key, the authentication of the third application conditioning the execution of the first application.

7. A terminal comprising a secure device, hosting a first application, the device comprising:
   reception means for receiving a first request for execution of the first application, originating from a second application, the second application being hosted by a second device, distinct from the secure device, and to receive a second request for execution of the first application originating from a third application generated by a trusted entity and transmitted to the second device, said third application comprising a session key, generating means for generating a random item for the first execution request and the session key dependent on the random item generated, dispatching means for dispatching said random item to the trusted entity, said random item being intended to allow the trusted entity to generate the session key, authentication means for authenticating the third application by means of the session key, the authentication of the third application conditioning the execution of the first application.

8. A trusted entity of a network, said entity being designed to generate and transmit an authenticatable application to a first device of a first environment, and comprising:

reception means for receiving a random item originating from a second device in a second environment, said second environment being secure and distinct from the first environment, said random item being generated for a first request for execution of a first application of the second device, originating from a second application of the first device, first generating means for generating a session key dependent on the random item, second generating means for generating an authenticatable application, said authenticatable application comprising instructions to calculate and encrypt an authentication value using the session key, dispatching means for dispatching said authenticatable application to the first device, said authenticatable application authenticating itself with the first application upon a second request comprising the authentication value for execution of the first application.

9. A system for securing the execution of an application, comprising:

a trusted entity, said entity generating and transmitting an authenticatable application to a first device of a first environment, and comprising:

reception means for receiving a random item originating from a second device in a second environment, said second environment being secure and distinct from the first environment, said random item being generated for a first request for execution of a first application of the second device, originating from a second application of the first device, first generating means for generating a session key dependent on the random item, second generating means for generating an authenticatable application, said authenticatable application comprising instructions to calculate and encrypt an authentication value using the session key, dispatching means for dispatching said authenticatable application to the first device, said authenticatable application authenticating itself with the first application upon a second request comprising the authentication value for execution of the first application, and at least one secure device, hosting a first application, the secure device comprising:

reception means for receiving a first request for execution of the first application, originating from a second application, the second application being hosted by a second device, distinct from the secure device, and to receive a second request for execution of the first application originating from a third application generated by a trusted entity and transmitted to the second device, said third application comprising a session key, generating means for generating a random item for the first execution request and the session key dependent on the random item generated, dispatching means for dispatching said random item to the trusted entity, said random item being intended to allow the trusted entity to generate the session key, authentication means for authenticating the third application by means of the session key, the authentication of the third application conditioning the execution of the first application.

10. The method as claimed in claim 1, furthermore comprising:

the dispatching to a server of a provider of configuration data, of a request for configuration parameters which are specific to a user of the first device, the receipt of configuration data, said configuration parameters being used to customize the authenticatable application during the step of generating the authenticatable application.

* * * * *